Oct. 14, 1969    W. H. CUTTINO    3,473,089
HIGH SPEED INTERPHASE SWITCHING ARRANGEMENT
Filed Sept. 25, 1967    2 Sheets-Sheet 1

WITNESSES:
Bernard R. Giguay
E. Strickland

INVENTOR
William H. Cuttino
BY G. T. Stratton
ATTORNEY

United States Patent Office 3,473,089
Patented Oct. 14, 1969

3,473,089
HIGH SPEED INTERPHASE SWITCHING ARRANGEMENT
William H. Cuttino, Bloomington, Ind., assignor to Westinghouse Electric Corporation, Pittsburgh, Pa., a corporation of Pennsylvania
Filed Sept. 25, 1967, Ser. No. 670,076
Int. Cl. H02h 7/16
U.S. Cl. 317—12          16 Claims

ABSTRACT OF THE DISCLOSURE

A high speed switching circuit for switching serially connected impedance devices, such as capacitors, in and out of a plurality of high voltage phase lines. Rapid interphase switching is provided by light energy signaling in which the energization of one lamp in a phase line segment effects the energization of a plurality of lamps upon sensing of current conditions in one or more of the phase lines. The plurality of lamps are located and connected to simultaneously signal all the phase line segments and thereby initiate the actuation of bypass switches connected across the impedance devices when the signal is received from the one lamp.

BACKGROUND OF THE INVENTION

The present invention relates generally to switch control systems, and particularly to a control system for automatically operated load break switches in multiple phase series capacitor installations.

In numerous multiple phase or other system applications, it is desirable that a plurality of switches or corresponding switches in the various phases be operated simultaneously in response to manually or automatically induced switch operating signals. Where the switches are connected in phase circuits to bypass or insert series impedance elements such as capacitors, the primary purpose for common switch operation is to maintain phase impedance balance. Other purposes can be served by the common switch operation where the switches are used for other reasons.

In the specific case of series capacitor installations, bypass switches are used in conjunction with bypass gaps for protectively bypassing the capacitors which are usually connected in a three-phase circuit. The switch gaps bypass the capacitors under extreme fault conditions and in addition can be closed or opened to vary, preferably with phase impedance balance, the total amount of series capacitive reactance in the transmission line served by the installation.

For a fuller description of the operating theory and the utility of series capacitor installations in transmission lines and the mechanical structure and electrical circuitry associated therewith, reference is made to copending application Ser. No. 390,288 filed by R. E. Marbury on Aug. 18, 1964, now Patent 3,385,941 issued May 28, 1968, and to U.S. Patent 3,335,362 issued to W. H. Cuttino (the present inventor) on Aug. 8, 1967, the application and the patent being assigned to the present assignee.

In certain high voltage three-phase systems, two parallel transmission lines are provided for transferring electrical energy from one location to another. If one of the lines is removed from service because of a system fault, the other line must handle the combined load of the two lines, the series capacitors in the line handling approximately double the normal load current for short periods of time.

To properly handle this increase in load and the resulting increase in the inductive reactive component, compensating capacitive reactance must be rapidly inserted in the line to insure maintenance of the higher power stability limit of the line. If excess power is transmitted over the line without an increase in capacitive reactance, instability or load asynchronization can result from the interacting line and load parameters.

BRIEF SUMMARY OF THE INVENTION

The present disclosure describes a high speed switching arrangement in which switching devices, such as load break bypass switches, are opened to insert additional impedance in a line handling excess current before the excess current damages system components or upsets circuit stability. The bypass switches are connected across impedance elements, such as capacitors serially connected in a high voltage line, and under ordinary current conditions the switches are closed so that the line and line current are shorted around the capacitors. (Other series capacitors are connected in the line to provide the above described compensating capacitive reactance for ordinary current conditions.)

The capacitors are disposed above the ground level on platform structures supported by insulating columns and may be divided in groups or segments in each phase with a bypass switch associated with each phase segment. An instantaneous current relay is serially connected in the line to sense the excess current flow. With the sensing of an excess current, the relay is energized to initiate opening of the bypass switches thereby inserting the capacitors in the line. When the current returns to normal, the relay is deenergized to allow closing of the bypass switches thereby removing the capacitors from the line.

Rapid interphase and interline switching is provided by light signaling between the location of the platforms above ground level and control locations at ground level. The light signals are conveyed between the platform and ground levels by insulating light rods disposed in insulating columns which may also house insulating air hoses for conveying air, when this is used, for arc extinguishing means or operating means of the bypass switches.

Each capacitor segment is provided with a light source and a light sensitive receiver located at the top of its associated air column, and a corresponding light source and receiver located at the bottom (ground level) of its air column. The light sources and receivers at ground level are supplied by a common source of power with a set of relay contacts associated with each receiver connected in series with each other and between the power source and the lights. When one of the current sensing relays detects an overcurrent in its phase line, it functions to deenergize the light located at the top of its associated air column which light energy was directed down to the corresponding light receiver disposed at the bottom of the column. The absence of light received by the receiver operates to open its serially connected contacts which causes the deenergization of all of the light sources at the ground level. The absence of light from these sources is instantly detected by each of the corresponding light receivers located at the top of the respective air columns which in turn function to initiate the opening of the bypass switches connected across the capacitors of their respective segments. In this manner, interphase switching and switching between parallel lines is rapidly accomplished so that all phases of the parallel lines are substantially instantly provided with equal capacitive reactance. Signaling with light energy, and the use of insulating light rods insures the complete electrical insulation and isolation of the high voltage capacitor segments from ground level, as well as high speed operation.

THE DRAWINGS

The objects and advantages of the invention will be apparent from the following detailed description taken in connection with the accompanying drawing, in which.

PREFERRED EMBODIMENTS OF THE INVENTION

Figure 1:
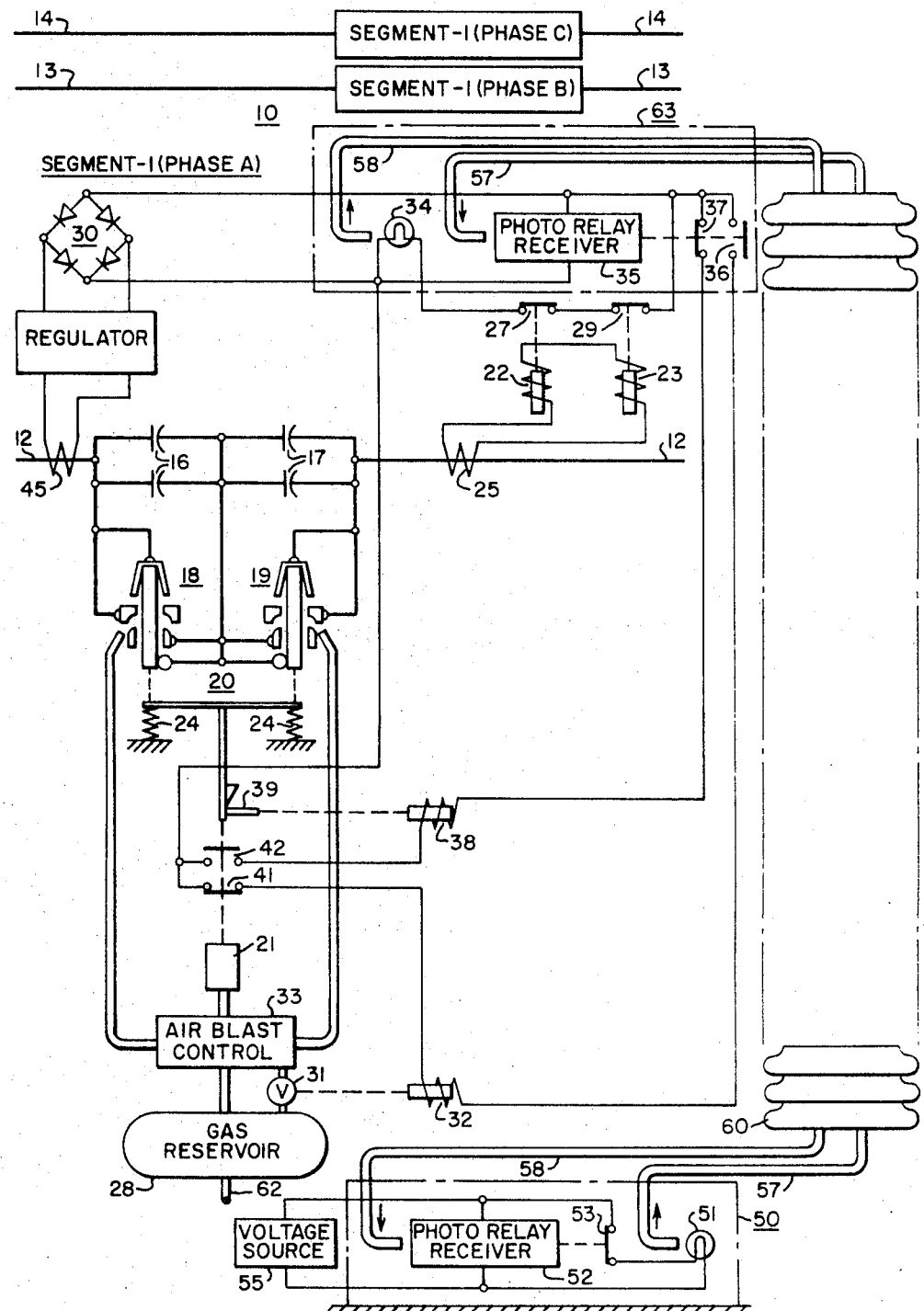
FIGURE 1 shows a schematic representation of a switching arrangement for one capacitor segment constructed in accordance with the principles of the invention.

Specifically, in FIG. 1, there is shown one segment of a capacitor installation 10 for a three phase electrical power transmission system. The segment is connected serially in phase lines 12, 13 and 14 of a high voltage line, and is further designated phases A, B and C for purposes of illustration. In FIG. 1, details of the switching circuit, constructed in accordance with the principles of the invention, are shown, the remaining phase lines having identical switching circuit structures. Similarly, additional segments (not shown) in the same phase lines and in the phase lines of a parallel high voltage line (not shown) would have identical circuit structures.

The segment for each phase line thus includes a plurality of capacitors 16 and 17 serially connected in the phase line, phase line 12 being the one chosen for illustration in FIG. 1.

The term "capacitor" refers to a single capacitor unit or to a plurality of capacitor units connected together in a subcombination. The term "capacitor bank" is used to denote all or a large fraction of all of the capacitor units in a given installation.

The series capacitors 16 and 17 are bypassed by normally closed load break switches 18 and 19 respectively connected across the capacitors. (In this manner, the impedance of the capacitors remains out of the lines in all three phases.) The load break switches include protective spark gaps which can be incorporated in a single mechanical unit as disclosed in the aforementioned Marbury application. The switches 18 and 19 in this case are so arranged and are thus mechanically operated as a single unit designated by numeral 20.

The switching unit 20 is mechanically connected to be opened against the force of a suitable spring means 24 by an air or gas cylinder 21 (only diagrammatically shown) such as described in the copending applications of Marbury and Cuttino though the invention is not limited thereto.

To sense the current flowing in the phase lines, for example phase line 12, two current relay devices 22 and 23 are shown connected in series to the line by a current transformer 25 though one relay would suffice. By using two such relays, an undesirable current response characteristic of one relay can be averaged out, and thereby corrected, by the second relay. The relays are preferably of the instantaneous current type.

The relays 22 and 23 have normally closed sets of contacts 27 and 29 respectively. These contacts are electrically connected in series between a rectifier bridge 30 and a signal lamp 34.

A photo relay receiver unit 35 is connected across the rectifier bridge 30, relay unit 35 comprising a suitable light sensitive element and an actuating solenoid (not shown) mechanically connected to actuate a set of contacts 36 and 37, the contacts 36 being normally open and the contacts 37 being normally closed. The contacts 36 and 37 are connected on one side of the rectifier bridge 30 and on the other side to the solenoids of relays 32 and 38 respectively, the solenoid 32 being mechanically connected to a bypass switch control valve 31, and the solenoid 38 actuating a latch means 39 operative to hold open the switch unit when it is opened by the cylinder 21. The control valve 31 is shown connected between a gas reservoir 28 and an air blast control means 33, adapted, among other things, to initiate opening of the switch unit 20 when actuated.

The circuit of the solenoid 32 is completed through a set of normally closed auxiliary contacts 41, the contacts being mechanically connected to the switch unit 20 and operated by the air or gas cylinder 21. The circuit of the solenoid 38 is completed through a set of normally open auxiliary contacts 42, the contacts being similarly connected to the switch unit 20 and operated by the cylinder 21.

The electrical circuit so far described is representative of each capacitor segment, and is generally disposed above the level of ground on a platform structure (not shown) with the capacitors so that the high voltages handled thereon are removed from ground level and the location of operating personnel.

The voltage used to operate the relays and the lamp 34 at platform level, and rectified by the bridge 30, is a low voltage provided by a transformer 45 connected in the phase line 12. The transformer steps down the voltage of the line 12 to a level suitable for the relays and lamp. Other means may be used to provide the low voltage on the platform, for example, well known capacitor potential divider devices. Preferably at ground level, and associated with each phase segment, is a control section generally designated 50. Each control section comprises a lamp 51 and a photo relay receiver 52 having a set of normally closed contacts 53.

Figure 2:
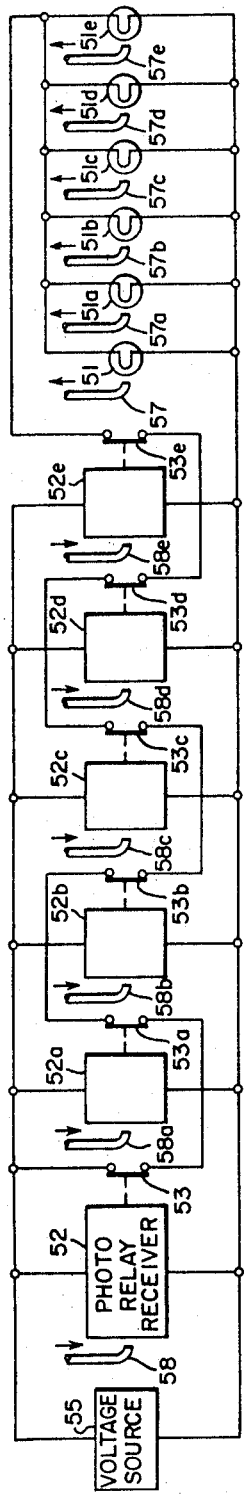
FIG. 2 is a schematic circuit diagram of light sources and receivers disposed at ground level and employed to simultaneously control switching in a plurality of capacitor segments located above ground level in accordance with the invention.

A schematic circuit diagram of the control section 50 in combination with five additional such control sections is shown in FIG. 2. Thus, the six sections comprise six lamps 51 through 51e, six photo relay receivers 52 through 52e, and six contact sets 53 through 53e. The six sections provide simultaneous capacitor switching in two high voltage, three phase lines in a manner presently to be explained. The control sections are energized by a common source of voltage 55.

As shown in FIG. 2, the lamps 51 through 51e are connected in parallel with each other but in series between the voltage source 55 and the contacts 53 through 53e, the contacts, in turn being connected in series with each other. The photo relay receivers 52 through 52e are connected in parallel with each other across the voltage source 55.

The lamp in each control section (FIG. 1) is optically connected to its corresponding photo relay receiver 35 by a light conducting means 57 extending between the lamp and receiver. In a similar manner, the photo relay receiver 52 is optically connected to its corresponding lamp 34 through a similar means 58. The light conducting means 57 and 58 may take the form of insulating glass or plastic tubes or rods capable of directing or confining the light energy in its travel from the lamps 51 and 34 to the receivers 35 and 52 respectively. The tubes or rods may be conveniently housed in an insulating column 60 which extends between ground level and the platform structure (not shown) supporting the capacitor banks (units 16 and 17) along with other associated components and the bypass switching circuit as thus far described.

In a series capacitor installation, the insulating column 60 is employed to house insulating air or gas hoses for supplying air or gas from a main supply (not shown) at ground level to pneumatically operated components such as the gas blast control means 33 and the gas reservoir tank 28 disposed adjacent the capacitor banks above ground level. In FIG. 1, an insulating hose 62 is partially and schematically shown connected to the tank 28.

The column 60 generally comprises a plurality of hollow insulating units stacked one upon the other such as shown and described in U.S. Patent 2,597,012 issued May 20, 1952 to R. E. Marbury and assigned to the present assignee.

The insulating columns and hoses maintain electrical isolation of the high voltage so that at ground level only low voltages are present. Thus, the use of the insulating, light conducting rods 57 and 58 in the insulating air column 60 does not compromise the efficiency of its insulating and isolating function.

For purposes of circuit illustration, the photo relay receivers 35 and 52, and the lamps 34 and 51 are shown disposed to the left of the insulating column 60 with the light conducting rods 57 and 58 bent in accommodation to their schematic locations. In actual practice, the lamp 34 and receiver 35 are housed as a single unit 63 and disposed atop the column 60. In a similar manner, the control section 50, as a unit, is disposed directly beneath the column. In this manner the lamps 34 and 51 are disposed in respective light energy communication with the receivers 52 and 35 through straight light conducting rods extending only the length of the insulating column 60.

In FIG. 1, the capacitor installation 10 is shown energized and functioning under normal current and load conditions with the bypass switches 18 and 19 in closed position. The lamp 34 is energized by the rectified voltage applied from the bridge 30 through the normally closed contacts 27 and 29 of relays 22 and 23 respectively. The light energy of the lamp is directed to the photo relay receiver unit 52 at ground level through the light conducting rod 58 thereby energizing the aforementioned light sensistive element within the receiver unit. With the light sensitive element energized, the receiver unit functions to maintain its relay contacts 53 in closed position thereby causing the energization of the lamp 51 which is connected to the voltage source 55 through the contacts 53. The light energy of the lamp 51 is, in turn, directed through the light conducting rod 57 up to the photo relay receiver unit 35, which when energized by the light energy functions to maintain its contact sets 36 and 37 in open and closed positions respectively. Each of the phase segments is operating in this manner, so that in FIG. 2, all of the lamps (51 through 51e) are lit and directing their light energies up to corresponding relay receivers through light conducting rods 57 through 57e.

The bypass switches 18 and 19 are held closed by the above mentioned spring means 24. The opening of the gap switches is initiated by the solenoid 32 which is normally in a deenergized state by virtue of the normally open contacts 36 of the receiver unit 35. The solenoid 38 is in a deenergized state by virtue of the open auxiliary contacts 42 of the bypass switch unit 20.

With normal current flow in the phase lines, the current sensing relays 22 and 23 are in a deenergized state with their contacts 27 and 29 closed as shown in the drawing and described above. When an overcurrent occurs on a line, such as would occur when the line is required to handle the load of a parallel line (not shown) in addition to its normal load (a combined load) because of a fault on the parallel line which requires its removal from service, the current sensing relays 22 and 23 are energized through the current transformer 25. The energization of the relays causes their contacts 27 and 29 to open which deenergizes the lamp 34. The absence of light directed to the photo relay receiver 52 (at ground level) from the lamp 34 causes the receiver 52 to open its contacts 53 thereby opening the power circuit to all the lamps 51 through 51e at ground level. All the lamps are thus simultaneously deenergized when any one of the photo relay receivers 52 through 52e are actuated to open their respective set of contacts 53 through 53e.

With the simultaneous deenergization of the lamps 51 through 51e (at ground level), and the instant absence of light directed to each corresponding photo relay receiver (35 in FIG. 1) located at each platform level, the receivers are instantly and simultaneously actuated to initiate the opening of their respective bypass switching units 20. This is accomplished by each receiver 35 being actuated to close its contacts 36 which complete a circuit for supplying power to the solenoid 32 from the rectifying bridge 30.

With the energization of the solenoid 32, the valve 31 is opened to deliver air pressure to the control means 33 from the gas reservoir 28 or from a main air line (not shown). The control means functions to deliver air pressure to the bypass switch opening cylinder 21 which is thereby actuated to open the bypass switches 18 and 19. The capacitors 16 and 17 are thereby inserted in the line 12 to increase the capacitive reactance needed in the line with the increase in load current.

The control means 33 is also used to direct air to valves (not shown) for controlling the release of air blasts in the bypass switches 18 and 19 when they are opening as explained in the aforementioned U.S. Patent 3,335,362. Thus, the solenoid 32 functions to open the capacitor bypass switch unit 20 thereby inserting the series capacitors in the phase lines. In this manner, the two phase lines 13 and 14 of the high voltage line shown in FIG. 1, and the three phase lines of a parallel high voltage line (not shown) are simultaneously provided with extra capacitor reactance so that all six phase lines will have equal capacitor reactance after an overcurrent occurs in one phase line (phase line 12 for example), and when the current returns to normal and the faulted line is returned to service.

When the capacitor bypass switch unit 20 opens, the auxiliary contacts 41 open and the auxiliary contacts 42 close. The open contacts 41 open the supply circuit to the solenoid 32 so that it is immediately deenergized to permit the valve 31 to reclose. The contacts 42 (now closed) connect the latch solenoid 38 to one side of supply voltage, namely, the rectifier bridge 30. However, the supply circuit is not completed through the solenoid 38 since the contacts 37 of the receiver 35 opened when the receiver was actuated by the absence of a light signal from the lamp 51 at ground level.

When the switch unit 20 opens, the latch means 39 functions to engage a ledge means on the switch unit to hold it open against the force of the spring 24.

When the current on the lines handling the excess or overcurrent returns to normal, the current sensing relays 22 and 23 are deenergized, thereby closing their contacts 27 and 29 (as shown).

The closing of the contacts 27 and 29 completes the supply circuit to the signaling lamp 34. The lamp is energized and sends a light signal through the light conducting rod 58 to the photo relay receiver 52 at ground level. This causes the receiver to close its contacts 53 (as shown), and if all line currents are below the setting of the low current relay 23 the supply circuit is completed to all the lamps (51 through 51e). All the lamps are thus simultaneously energized to send light signals through their respective rods 57 through 57e to their respective relay receivers 35 at platform level. The receivers initiate the closing of their respective capacitor bypass switch units 20 in the following manner.

The relay receiver 35 in each phase segment is actuated by the light signal received from its associated lamps at ground level, and functions to open its contacts 36 and close its contacts 37. The opening of the contacts 36 functions to open the supply circuit to the solenoid 32. The closing of the contacts 37 functions to energize the latch relay 38 which operates to release the latch means 39 holding the bypass switch unit 20 open. This action allows the spring means 24 in each phase segment to close its bypass switch unit thereby removing its capacitors (16 and 17) from the lines 12, 13 and 14. The closing occurs simultaneously in each phase segment so that all the phase lines will have equal capacitive reactance when the faulted line or lines are returned to service.

When the bypass switch unit 20 is closed by the spring means 24, the spring means also functions to close the auxiliary contacts 41, and to open the auxiliary contacts 42 so that the latch solenoid 38 is returned to its normal deenergized state. The circuit is now ready to insert the capacitors in the phase line upon the sensing of another overcurrent condition by the current sensing relays 22 and 23.

In many cases, line current signals are available at ground level from suitable current transformers associated with line circuit breakers (not shown) so that operation of these current transformers can be employed to initiate opening and closing of the switch units 20 as explained above in connection with the current transformer 25 and the current sensing relays 22 and 23.

Figure 3:
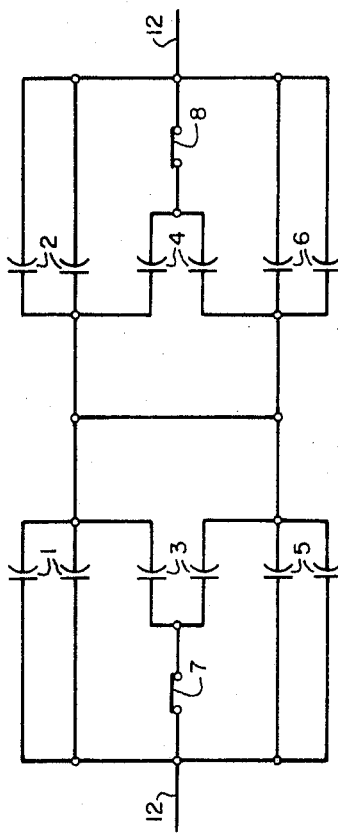
FIG. 3 is a schematic diagram of an alternative embodiment of the switching arrangement shown in FIG. 1.

The circuit arrangement shown in FIG. 1, and as thus far explained, functions to insert cold capacitors into the phase lines with the opening of the bypass switches 18 and 19. With capacitors operating in low ambient temperature conditions, it is preferable to insert into the lines capacitors that are warm. FIG. 3, diagrammatically, shows such an arrangement.

In FIG. 3, series capacitors 1 to 6 are shown connected in two groups with each group having three parallel circuits and associated switches 7 and 8 connected in series with capacitors 3 and 4 respectively.

The capacitive reactance in the line 12 is increased by opening the switches 7 and 8 which disconnect part of the parallel capacitors, namely, the capacitors 3 and 4. In this manner, the switching of cold capacitors into the line 12 is avoided since the capacitors 1, 2, 5 and 6, already in the line and therefore warm, are called upon to provide the increased capacitive reactance.

When conditions on line 12 return to normal, the switches 7 and 8 are closed to reinsert the capacitors 3 and 4 thereby lowering the capacitive reactance in the line. Control of the switches may be accomplished in the manner described above in connection with the arrangement shown in FIG. 1, or in any other suitable manner.

From the foregoing description it should now be apparent that a highly effective interphase switching arrangement has been disclosed in which impedance devices (such as capacitors) in a plurality of high voltage phase lines are simultaneously and instantly inserted in and removed from the lines upon the sensing of current conditions in one or more of the lines. This is accomplished by light energy signaling means in which one lamp in a phase segment control the energization of a plurality of lamps located and connected to simultaneously signal all the phase line segments and initiate the actuation of bypass switches connected across the impedance devices. Further, the above control is accomplished by a minimum of components which occupy a minimum of space.

What is claimed is:

1. A switching arrangement for actuating simultaneously a plurality of switching devices, each of said devices being effective to switch electrical components into and out of a circuit, the arrangement comprising,
    means associated with each of said components for sensing the instantaneous current flow therethrough, and for initiating the opening of said switching devices when an excess current is sensed,
    a light source and receiver associated with each of said electrical components and said current sensing means, and disposed adjacent each location thereof,
    a corresponding light source and receiver disposed at a control location remote from each of said electrical components, and in light signal communication with the corresponding light source and receivers disposed adjacent said electrical components,
    said instantaneous current sensing means being effective to effect the energization of its associated light source when the excess current is sensed,
    said light source being effective to simultaneously effect the energization of all the light sources and receivers at said control location,
    the light sources at said control location being effective to signal their corresponding light receivers disposed at the component location, and
    each of the light receivers being effective to initiate the opening and closing of their associated switching devices in response to the signals received from the light sources at said control location.

2. The switching arrangement described in claim 1 in which the electrical components are capacitor units connected in series in high voltage lines,
    said capacitor units being supported at a location above the level of the ground.

3. The switching arrangement described in claim 1 in which the switching devices are load break switches having arc extinguishing air blast means disposed above the level of the ground,
    insulating hose means for supplying air from ground level to the air blast means,
    an insulating column extending between the ground level and a location above ground level for housing the hose means,
    the light source and receiver associated with each capacitor unit disposed at the top of the insulating column, and the corresponding light source and receiver at the control location disposed at the bottom of the insulating column, and
    light directing means disposed in the insulating column for directing light energy to and from the light sources and receivers disposed at the top and bottom of the insulating column.

4. The switching arrangement described in claim 1 in which the light sources and receivers at the control location are supplied with a common source of power, with each of the receivers having a set of contacts connected in series with each other and connected between the power source and all of the light sources.

5. The switching arrangement recited in claim 1 in which the switching devices are bypass switches,
    and each of the electrical components has an associated one of said bypass switches connected thereacross.

6. The switching arrangement recited in claim 1 in which the electrical components have other components connected in parallel therewith,
    the switching devices being connected in series with the components to be switched into and out of the circuit.

7. A switching arrangement for rapid actuation of a switching device connected to switch an electrical component into and out of a circuit, the arrangement comprising
    means for sensing the instantaneous current flow through said component,
    a light source and receiver associated with said component and said current sensing means, and disposed adjacent the location of said component and sensing means,
    a corresponding light source and receiver disposed at a control location remote from said component, and in light signal communication with said light source and receiver disposed adjacent said component,
    said instantaneous current sensing means adapted to effect the energization of its associated light source when an excess current is sensed,
    said light source adapted to signal said receiver at the control location to effect the energization of the light source at the control location,
    said light source at said control location being effective to signal said light receiver at the component location,
    said receiver at the component location being effective to initiate opening and closing of the switching device in response to the signal from said light source at the control location.

8. The arrangement described in claim 7 in which the electrical component is a capacitor unit connected in series in a high voltage line.

9. The arrangement described in claim 7 including an insulating column, the light source and receiver adjacent the electrical component disposed at the top end of the column, and the light source and receiver at the control location disposed at the bottom of the column, and light energy directing means disposed in the insulating column and extending between the light sources and receivers disposed at the ends of the column.

10. The arrangement described in claim 7 in the electrical component is disposed at a location above the level of the ground, an insulating column extending between the location above ground level and ground level, and light directing means disposed in said insulating column for directing light energy between the light sources and receivers disposed adjacent the electrical component and control locations.

11. A series capacitor installation for connection in an alternating current line, said installation comprising a plurality of series capacitors and associated switching devices for switching each of said capacitors into and out of the line, a switching arrangement for actuating simultaneously the plurality of switching devices, the arrangement comprising means associated with each of said capacitors for sensing the instantaneous current flow therethrough, and for initiating the opening of said switching devices when an excess current is sensed, a light source and receiver associated with each of said capacitors and said current sensing means, and disposed adjacent each location thereof, a corresponding light source and receiver disposed at a control location remote from each of said electrical components, and in light signal communication with the corresponding light source and receivers disposed adjacent said electrical components, said instantaneous current sensing means being effective to effect the energization of its associated light source when the excess current is sensed, the light source being effective to signal its corresponding receiver at said control location and thereby simultaneously effect the energization of all the light sources at said control location, the light sources at said control location being effective to simultaneously signal their corresponding light receivers disposed at the component location, and each of the light receivers being effective to initiate the opening and closing of their associated switching devices in response to the signal from the light sources at said control location.

12. The installation described in claim 11 in which the switching devices are load break switches having arc extinguishing air blast means disposed above the level of the ground, insulating hose means for supplying air from ground level to the air blast means, an insulating column extending between the ground level and a location above ground level for housing the hose means, the light source and receiver associated with each capacitor disposed at the top of the insulating column, and the corresponding light source and receiver at the control location disposed at the bottom of the insulating column, and light directing means disposed in the insulating column for directing light energy to and from the light sources and receivers disposed at the top and bottom of the insulating column.

13. The installation described in claim 11 in which the switching devices and current sensing means are connected in two parallel, three phase lines with at least one switching device and sensing means connected in each of the phase lines.

14. The installation recited in claim 11 in which the switching devices are bypass switches, and each of the capacitors has an associated one of said bypass switches connected thereacross.

15. The installation recited in claim 11 in which the capacitors have other capacitors connected in parallel therewith, the switching devices being connected in series with the capacitors to be switched into and out of the circuit.

16. The installation recited in claim 11 in which the alternating current line includes at least two parallel, three phase lines.

References Cited

UNITED STATES PATENTS

| | | | |
|---|---|---|---|
| 2,949,567 | 8/1960 | Johnson | 317—12 |
| 3,249,814 | 5/1966 | Price et al. | 317—12 |
| 3,385,941 | 5/1968 | Marbury | 317—12 X |

JOHN F. COUCH, Primary Examiner

J. D. TRAMMELL, Assistant Examiner

U.S. Cl. X.R.

317—20, 50